Patented Dec. 31, 1935

2,026,418

UNITED STATES PATENT OFFICE 2,026,418

WELDING ROD

John J. Crowe, Westfield, N. J., assignor to Air Reduction Company, Incorporated, New York, N. Y., a corporation of New York No Drawing. Application April 11, 1933, Serial No. 665,557

3 Claims. (Cl. 219—8)

This invention relates to welding rods, and more especially to welding rods suitable for welding operations performed with the oxyacetylene flame. Such operations include the uniting of ferrous metal parts with the addition of fused metal, the building up of worn parts, the facing or sheathing of metal members, etc.

A particular kind of operation for which the welding rods of the invention are well adapted is the welding together of the ends of pipe lengths, as in the construction of pipe lines. Naturally, however, the utility of the welding rods is not restricted to a specific field.

The general object of the invention is to provide a welding rod with which welding can be performed rapidly and strong and very satisfactory welds can be easily produced. The rod is serviceable for both puddle welding, in which substantial amounts of parent metal are melted, and for the kind of welding in which there is little apparent melting of the parent metal. In this form of welding, the surfaces of the parent metal exhibit a phenomenon known as wetting, and the metal fused and added from the rod flows and unites with the wetted surfaces. The success of such welding depends largely upon the composition of the welding rod.

I have discovered that welding rods consisting of a low to medium carbon ferrous alloy containing both nickel and vanadium in combination with manganese and silicon, the silicon in no case to be less than 0.10% and the manganese to be two or more times the silicon content but in no case less than 0.40%, give surprisingly excellent results when applied in either puddle welding or wetting welding, the benefits, in the latter case, being especially striking. Naturally, small amounts of other elements commonly contained in steels will or may be present, and the addition of ingredients not materially altering the welding characteristics is not necessarily excluded.

The nickel content of the rods should be substantial, that is to say upwards of 1.00%, or between 1.00% and 4.00%. A proportion that is very satisfactory for most purposes is about 2.00%–2.50% nickel.

It is well known that the addition of nickel to the composition of a carbon steel welding rod increases the tensile strength and toughness of the welded joint, but the addition of nickel alone is open to the objection that, in many instances, the welds contain what are known as pinhole defects, that is to say, there are small blow-holes in the weld, which when the weld is subjected to a hydrostatic test, may give slow leakage. The pin-hole defects may contain gases formed in making the weld, or oxides of the various constituents which go to make up the rod, or a combination of both. I have ascertained that by the addition of vanadium this difficulty is eliminated. Percentages of vanadium that are useful are between 0.05% and 0.50%, about 0.15%–0.25% being very satisfactory.

As stated, the rods are low carbon rods, the range falling within 0.05% and 0.30% carbon.

A specific example of the invention is an alloy steel welding rod containing: Ni, 2.23%; V, 0.20%; C, 0.12%; Mn, 0.58%; Si, 0.24%.

The manganese may be between 0.40% and 0.80%, and may be added up to about 1.20%, though an amount of manganese corresponding to that added in what are ordinarily known as manganese steels is not necessary for these rods. The silicon content is preferably between 0.10% and 0.30%, though a larger amount may be used, up to about 0.45%.

These welding rods have flowing characteristics which offer decided advantages over welding rods formerly used. The fused rod metal flows freely and seems to have a special property of penetrating the parent metal. This penetration is probably an alloying action that goes on between the added metal and the parent metal. The molten rod metal also has an excellent wetting action.

Another feature of the rods is this: If two pieces of metal to be united are properly chamfered and spaced a distance apart and then welded there is a tendency, with ordinary rods, for the added metal to work down between the joint and form what is known as "icicles" on the under side of the weld. For pipe welding and for certain other classes of welding where it is not possible or practical to weld from both sides, the formation of these icicles is very objectionable. The rods of this invention can be used for the welding of pipe and other parts which have been spaced a considerable distance, without the formation of icicles. This may be due to the viscosity of the molten metal, but is more probably due to surface tension.

I claim:

1. A welding rod consisting of an iron alloy containing less than 0.30% carbon, nickel between 1.00% and 4.00%, vanadium between 0.05% and 0.50%, manganese between 0.40% and 1.20% and silicon between 0.10% and 0.45%.

2. A welding rod consisting of an iron alloy containing less than 0.30% carbon, about 2.00%–2.50% nickel, 0.10%–0.25% vanadium, 0.40%–0.80% manganese, and 0.10%–0.30% silicon.

3. A welding rod having the following approximate composition, nickel 2.23%, vanadium 0.20%, manganese 0.58%, silicon 0.24%, carbon 0.12%, the rest of the composition being substantially iron.

JOHN J. CROWE.